United States Patent
Chikagawa et al.

(10) Patent No.: US 8,540,014 B2
(45) Date of Patent: Sep. 24, 2013

(54) VEHICLE AIR CONDITIONER

(75) Inventors: Noriyuki Chikagawa, Aichi (JP); Shiro Matsubara, Aichi (JP); Yasunari Tanaka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 583 days.

(21) Appl. No.: 12/527,106

(22) PCT Filed: Jan. 30, 2008

(86) PCT No.: PCT/JP2008/051444
§ 371 (c)(1),
(2), (4) Date: Aug. 13, 2009

(87) PCT Pub. No.: WO2008/108125
PCT Pub. Date: Sep. 12, 2008

(65) Prior Publication Data
US 2010/0025011 A1 Feb. 4, 2010

(30) Foreign Application Priority Data
Mar. 8, 2007 (JP) ................................. 2007-058662

(51) Int. Cl.
*F28F 27/00* (2006.01)
*B60H 1/00* (2006.01)
*B60H 3/00* (2006.01)

(52) U.S. Cl.
USPC ................ 165/204; 165/200; 165/42; 165/96

(58) Field of Classification Search
USPC ............... 165/202–204, 42–43, 96, 100–103; 62/244; 454/159–161
See application file for complete search history.

(56) References Cited

U.S. PATENT DOCUMENTS

| | | | |
|---|---|---|---|
| 2004/0035568 A1* | 2/2004 | Katou et al. ................... | 165/204 |
| 2004/0069483 A1* | 4/2004 | Natsume et al. ............... | 165/204 |
| 2004/0069484 A1* | 4/2004 | Tokunaga et al. ............. | 165/204 |
| 2004/0074244 A1* | 4/2004 | Ichishi et al. ................... | 62/186 |
| 2004/0079523 A1* | 4/2004 | Shiraishi et al. ............... | 165/204 |

(Continued)

FOREIGN PATENT DOCUMENTS

| | | | |
|---|---|---|---|
| EP | 1514708 | * | 3/2005 |
| EP | 1514708 A1 | | 3/2005 |

(Continued)

OTHER PUBLICATIONS

International Search Report of PCT/JP2008/051444, Mailing Date of Feb. 26, 2008.

(Continued)

*Primary Examiner* — Frantz Jules
*Assistant Examiner* — Henry Crenshaw
(74) *Attorney, Agent, or Firm* — Westerman, Hattori, Daniels & Adrian, LLP

(57) ABSTRACT

In a vehicle air conditioner (1) employing an air-mix method, airflow which passed through a bypass channel (14) and airflow which passed through a heated air channel (13) are mixed in an air-mix area (15) located downstream of an air-mix damper (6) and the airflow is guided to a foot outlet (19) through a foot channel (18) provided on the back side of a partition wall (2A) constituting the heated air channel (13). The vehicle air conditioner includes a mixing enhancement portion (50) that makes airflow flowing along the partition wall (2A) flow toward the air-mix area (15) and an introduction portion (60) that is continuous with the mixing enhancement portion (50) and smoothly guides the airflow after air mixing to the foot channel (18) are provided at an end (30) of the partition wall (2A) constituting an outlet of the heated air channel (13).

5 Claims, 3 Drawing Sheets

(56) References Cited

U.S. PATENT DOCUMENTS

| | | | |
|---|---|---|---|
| 2004/0103679 A1* | 6/2004 | Ichishi et al. | 62/244 |
| 2004/0112075 A1* | 6/2004 | Kachi | 62/244 |
| 2004/0182561 A1* | 9/2004 | Ozeki et al. | 165/202 |
| 2004/0194913 A1* | 10/2004 | Umebayashi et al. | 165/42 |
| 2004/0194948 A1* | 10/2004 | Shibata et al. | 165/204 |
| 2004/0200611 A1* | 10/2004 | Tamatsu | 165/203 |
| 2005/0067139 A1 | 3/2005 | Marginean | |

FOREIGN PATENT DOCUMENTS

| | | |
|---|---|---|
| EP | 1514708 A1 * | 3/2005 |
| JP | 2003-034119 A | 2/2003 |
| JP | 2004-148963 A | 5/2004 |
| JP | 2004-237875 * | 8/2004 |
| JP | 2004-237875 A | 8/2004 |
| JP | 2004237875 A1 * | 8/2004 |
| JP | 2006-213317 A | 8/2006 |

OTHER PUBLICATIONS

European Search Report dated Sep. 21, 2011, issued in corresponding European Patent Application No. 08704207.3.

Japanese Office Action dated Oct. 6, 2009, issue in corresponding Japanese Patent Application No. 2007-058662.

* cited by examiner

VEHICLE AIR CONDITIONER

TECHNICAL FIELD

The present invention relates to vehicle air conditioners employing an air-mix method, in which a foot channel for guiding airflow to a foot outlet is formed on the back side of a partition wall constituting a heated air channel in which a heater core is disposed.

BACKGROUND ART

The proportion of the air-mix method being used as the temperature control method for vehicle air conditioners is high. Vehicle air conditioners employing this air-mix method have a heater core disposed on the downstream side of an evaporator disposed in an air channel and a bypass channel for bypassing the heater core, and control the temperature by adjusting, with an air-mix damper, the flow rate ratio of airflow to be reheated by the heater core to airflow cooled by the evaporator and by mixing the airflow reheated by the heater core and the airflow caused to bypass the heater core in an air-mix area on the downstream side thereof.

Among the above-described vehicle air conditioners employing the air-mix method, those in which the foot channel for guiding airflow mixed in the air-mix area to the foot outlet is formed on the back side of the partition wall constituting the heated air channel are known (for example, see Patent Documents 1 and 2).

Patent Document 1 discloses one in which an end of the partition wall is curved frontward and is formed into a streamline shape, and airflow heated by the heater core is made to flow on the upstream side of the air-mix area, so that air mixing is enhanced and the airflow is smoothly guided to the foot channel along the end of the streamline shape.

Patent Document 2 discloses one in which the vicinity of the end of the partition wall is curved frontward and the end is made to serve as an edge end, a swelled portion swelled toward the inside of the foot channel is formed in the vicinity of an inlet of the foot channel on the back side of the partition wall located downstream of the edge end, and a stagnation portion of the flow generated in the vicinity of the downstream of the edge end is filled with the swelled portion, so that an increase in air-flow resistance due to the stagnation portion is restricted, increasing air flow rate and reducing noise.

Patent Document 1: Japanese Unexamined Patent Application, Publication No. 2003-34119

Patent Document 2: Japanese Unexamined Patent Application, Publication No. 2004-148963

DISCLOSURE OF INVENTION

However, in the one disclosed in Patent Document 1, because warm air flowing along the partition wall flows so as to be attached to the wall surface having a streamline shape, due to the Coanda effect (see dashed line arrow in FIG. 3), the air mixing performance with cool air flowing into the air-mix area through the bypass channel is degraded, whereby warm air and cool air flow downstream while maintaining a layered structure having a difference in temperature. Therefore, in a multi-blowing mode such as a bi-level mode, the difference in temperature between the air blown from an upper outlet and the air blown from a lower outlet increases, resulting in a problem of deterioration of comfort. If a rib or the like is added to improve the air mixing performance in order to achieve comfortable temperature characteristics, the effect of reduced pressure loss decreases, resulting in an increase in noise. Moreover, if a shape that is sufficiently streamlined so as not to cause separation is to be formed, the curvature inevitably has to be small and space is taken up, which runs counter to size reduction of the unit and is problematic.

Furthermore, in the one disclosed in Patent Document 2, a large separation of the airflow occurs at the edge end of the partition wall, generating large vortex flow and generating the stagnation portion in the downstream area thereof. As a result, the airflow is disturbed and the air mixing performance is improved. However, this inevitably causes a decrease in the air flow rate and increase in noise due to pressure loss. In particular, in recent vehicles, quietness of vehicle cabins has been increasingly enhanced, and there is also a strong tendency to require air conditioners be extremely quiet. Thus, an increase in noise would be a serious problem.

As described above, to achieve high quietness, a reduction in pressure loss in the unit is essential. However, if bound too much by a reduction in pressure loss, the difference between the upper and lower temperatures increases in the multi-blowing mode, deteriorating the level of comfort achieved by temperature control. Vehicle air conditioners are required to overcome the above-described contradictory problems at the same time.

The present invention has been made in view of such circumstances, and an object thereof is to provide a vehicle air conditioner capable of maintaining comfortable temperature-controlling properties by improving the air mixing performance while reducing separation in the air channel to increase the air flow rate and reduce noise.

To solve the above-described problems, the vehicle air conditioner of the present invention employs the following solutions.

That is, in a vehicle air conditioner according to the present invention, a bypass channel and a heated air channel that has a heater core disposed therein, through which channels an airflow having a flow rate ratio adjusted by an air-mix damper flows, are formed in an air channel on the downstream side of an evaporator. The airflow which passed through the bypass channel and the airflow which passed through the heated air channel are mixed in an air-mix area located downstream of the air-mix damper, the airflow being guided to a foot outlet through a foot channel provided on the back side of a partition wall constituting the heated air channel. A mixing enhancement portion that makes the airflow flowing along the partition wall flow toward the air-mix area and an introduction portion that is continuous with the mixing enhancement portion and smoothly guides the airflow after air mixing to the foot channel are provided at an end of the partition wall constituting an outlet of the heated air channel.

With the present invention, because the mixing enhancement portion that makes the airflow flowing along the partition wall flow toward the air-mix area is provided at the end of the partition wall constituting the outlet of the heated air channel, the warm air from the heated air channel can be effectively made to flow toward the air-mix area, without causing a large separation. This makes it possible to improve the air mixing performance of the warm air which passed through the heater core and the cool air which passed through the bypass channel and to adjust the difference between the upper and lower temperatures in a multi-blowing mode in an appropriate range, whereby comfortable temperature-controlling properties can be maintained. Furthermore, because the introduction portion that smoothly guides the airflow after air mixing to the foot channel is provided so as to be continuous with the mixing enhancement portion, the occurrence of stagnation and a large separation of the airflow in the vicinity of the inlet of the foot channel can be restricted. This can reduce the pressure loss in the air channel, increasing the air flow rate and reducing noise. Accordingly, it is possible to simultaneously satisfy an improvement of the quietness and maintenance of comfortable temperature-controlling properties.

The vehicle air conditioner of the present invention may be configured such that, in the above-described vehicle air conditioner, the mixing enhancement portion is formed of a first convex curved surface having a curvature allowing the airflow to be easily separated, and the introduction portion is formed of a second convex curved surface having a smaller curvature than the first convex curved surface.

According to this structure, because the mixing enhancement portion is formed of the first convex curved surface having a curvature allowing the airflow to be easily separated, the airflow flowing along the partition wall is easily separated, and it is possible to make the warm air from the heated air channel flow effectively toward the air-mix area without causing a large separation. In addition, because the introduction portion is formed of the second convex curved surface having a smaller curvature than the first convex curve, the temperature-controlled air after air mixing can be smoothly introduced into the foot channel along the second convex curved surface having a small curvature. Accordingly, it is possible to maintain comfortable temperature-controlling properties by improving the air mixing performance, as well as to increase the quietness by restricting pressure loss in the air-mix area as much as possible to increase the air flow rate and reduce noise. In the present invention, the first convex curved surface having a curvature that allows the airflow to be easily separated is a curved surface having a radius of several mm, and the second convex curved surface having a smaller curvature than the first convex curved surface is a curved surface having a radius from about ten mm to several tens of mm.

The vehicle air conditioner of the present invention may be configured such that, in the above-described vehicle air conditioner, the first convex curved surface and the second convex curved surface are connected by a plane having a linear cross section in a flow direction.

According to this structure, because the first convex curved surface and the second convex curved surface are connected by the plane having a linear cross section in the flow direction, not only can the optimal curvatures be selected for the respective first convex curved surface and second convex curved surface, but also the design flexibility of the shape of the end can be significantly improved because of the provision of the linear plane portion therebetween. Accordingly, the optimal design that simultaneously satisfies an improvement of the quietness and maintenance of comfortable temperature-controlling properties is possible.

The vehicle air conditioner of the present invention may be configured such that, in any one of the above-described vehicle air conditioners, a direction changing portion that directs an outflow direction of the airflow flowing from the heated air channel to the air-mix area toward a direction in which it collides with the cool air flowing from the bypass channel to the air-mix area is provided in an upstream area of the mixing enhancement portion.

According to this structure, because the direction changing portion that directs the outflow direction of the airflow flowing from the heated air channel to the air-mix area toward the direction in which it collides with the cool air flowing from the bypass channel to the air-mix area is provided in an upstream area of the mixing enhancement portion, all of the warm air which passed through the heated air channel can be made to flow in the direction in which it collides with the cool air, into the air-mix area, by the direction changing portion. This can enhance mixing of the cool air and the warm air and improve the air mixing performance. Accordingly, the difference between the upper and lower temperatures can be controlled in an appropriate range, and comfortable temperature-controlling properties can be maintained. Moreover, because this makes it possible to narrow the air-mix area, the unit can be made compact.

The vehicle air conditioner of the present invention may be configured such that, in the above-described vehicle air conditioner, the direction changing portion is formed of a smooth concave curved surface.

According to this structure, because the direction changing portion is formed of a smooth concave curved surface, the outflow direction of all of the warm air which passed through the heated air channel can be smoothly directed to the direction in which it collides with the cool air, without increasing channel resistance. This can restrict an increase in pressure loss in the air channel and improve the air mixing performance while increasing the quietness, whereby comfortable temperature-controlling properties can be maintained.

The vehicle air conditioner of the present invention may be configured such that, in the above-described vehicle air conditioner, the concave curved surface serves as a damper abutting surface to which an end of the air-mix damper is abutted when the outlet of the heated air channel is closed during maximum cooling.

According to this structure, because the concave curved surface serves as the damper abutting surface to which the end of the air-mix damper is abutted when the outlet of the heated air channel is closed during maximum cooling, the provision of a separate sealing portion to which the end of the air-mix damper is abutted when the outlet of the heated air channel is closed by the air-mix damper is unnecessary. This can simplify the structure and, because the abutting surface is curved, improve the fit of the end of the air-mix damper and increase the sealing properties.

The vehicle air conditioner of the present invention may be configured such that, in any one of the above-described vehicle air conditioners, the end of the partition wall is structured such that a part or the entirety thereof is formed to be segmented from other portions of the partition wall and the segment is assembled therewith.

According to this structure, because the end of the partition wall is structured such that a part or the entirety thereof is formed to be segmented from other portions of the partition wall and the segment is assembled therewith, even if the thickness of the end of the partition wall increases and it is difficult to form the entire partition wall integrally with the unit casing, a part or the entirety thereof can be separately formed. Accordingly, it is possible to easily cope with a problem associated with shaping.

The vehicle air conditioner of the present invention may be configured such that, in the above-described vehicle air conditioner, the segment of the end of the partition wall is segmented into a plurality of segments in the width direction of the air channel and the segments are assembled.

According to this structure, because the segment of the end of the partition wall is segmented into a plurality of segments in the width direction of the air channel and the segments are assembled, not only is it possible to easily cope with a problem associated with shaping due to an increase in thickness of the end of the partition wall, but it is also possible to appropriately cope with a case where the end of the partition wall has to be segmented depending on the structure of the unit or the size thereof in the width direction.

The vehicle air conditioner of the present invention may be configured such that, in the above-described vehicle air conditioner, if a partition plate for dividing the air channel into left and right is provided, some of the segments are provided integrally with the partition plate.

According to this structure, because, if a partition plate for dividing the air channel into left and right is provided, some of the segments are provided integrally with the partition plate, a structure in which the end of the partition wall is segmented does not increase the component count. Accordingly, it can be suitably applied to a vehicle air conditioner employing the left and right independent temperature control method, having the partition plate, or the like.

According to the present invention, by making the warm air from the heated air channel flow effectively toward the air-mix area, without causing a large separation, it is possible to improve the air mixing performance of the warm air which passed through the heater core and the cool air which passed through the bypass channel, to adjust the difference between the upper and lower temperatures in a multi-blowing mode in an appropriate range, and to maintain comfortable temperature-controlling properties. Furthermore, by restricting the occurrence of stagnation and a large separation of the airflow in the vicinity of the inlet of the foot channel, it is possible to reduce the pressure loss in the air channel, increasing the air flow rate and reducing noise. Accordingly, it is possible to simultaneously satisfy an improvement of the quietness and maintenance of comfortable temperature-controlling properties.

EXPLANATION OF REFERENCE SIGNS

Figure 1:
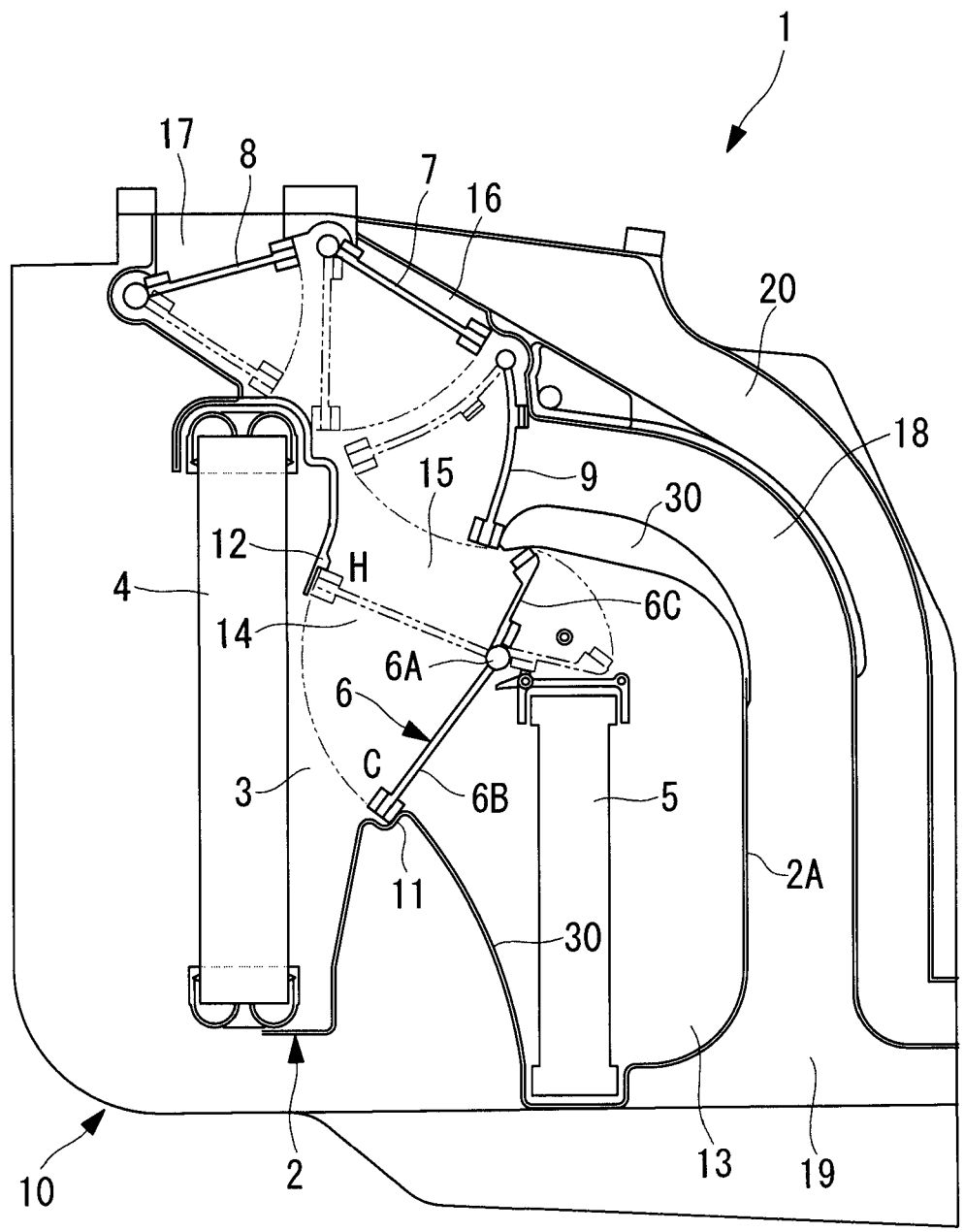
FIG. 1 is a sectional view showing the structure of a vehicle air conditioner according to a first embodiment of the present invention.

1: vehicle air conditioner
2: casing
2A: partition wall
3: air channel
4: evaporator
5: heater core
6: air-mix damper
13: heated air channel
14: bypass channel
15: air-mix area
18: foot channel
19: foot outlet
30: end of partition wall
30A, 30B, 30C, 30D: segment
40: direction changing portion
50: mixing enhancement portion
60: introduction portion
70: partition plate
A: warm air
B: cool air

BEST MODE FOR CARRYING OUT THE INVENTION

Embodiments of the present invention will be described below using the drawings.

First Embodiment

A first embodiment of the present invention will be described below with reference to FIGS. 1 to 3.

FIG. 1 shows a sectional view showing the structure of a vehicle air conditioner 1 according to a first embodiment of the present invention. The vehicle air conditioner 1 has a casing 2, made of resin, connected to a blower unit (not shown). In the casing 2, an air channel 3 through which airflow from the blower unit flows is formed. The casing 2 is formed of a plurality of segments, which are assembled together after air-conditioning components, such as an evaporator 4, a heater core 5, an air-mix damper 6, and a plurality of blowing-mode switching dampers 7, 8, and 9, are accommodated therein, whereby an HVAC unit 10 is formed.

On the downstream side of the evaporator 4, the air channel 3 is narrowed by two upper and lower sealing portions 11 and 12, to which the air-mix damper 6 is abutted, and is then branched into two channels, namely, a heated air channel 13 in which the heater core 5 is provided and a bypass channel 14 for bypassing the heater core 5. The heated air channel 13, on the downstream side of the heater core 5, extends upward, passes above the heater core 5, and rejoins the bypass channel 14 at an air-mix area 15. On the downstream side of the air-mix area 15, the air channel 3 communicates with a face outlet 16 and a DEF outlet 17, communicates with a foot outlet 19 through a foot channel 18, and communicates with a rear seat outlet (not shown) through a rear seat duct 20.

The evaporator 4, together with a compressor, condenser, expansion valve, and the like (not shown), constitutes a known refrigeration cycle and cools the air by causing refrigerant circulated in the refrigeration cycle to perform heat exchange with the air sent from the blower unit (not shown), thus evaporating the refrigerant. The evaporator 4 includes a tube-fin type multilayer heat exchanger having a box-like exterior with a predetermined thickness and is disposed perpendicularly in the HVAC unit 10 so as to cross the air channel 3, at the upstream-most position in the air channel 3.

The heater core 5, through which warm water is circulated from a vehicle engine (not shown) through a cooling water circuit, is provided in the heated air channel 13 and heats the air by causing the warm water to perform heat exchange with the air cooled by the evaporator 4. The heater core 5 includes a tube-fin type multilayer heat exchanger having a box-like exterior with a predetermined thickness, and is disposed perpendicularly so as to cross the heated air channel 13, substantially in parallel with the evaporator 4.

The air-mix damper 6 is located between the evaporator 4 and the heater core 5, and a rotation shaft 6A is disposed in the vicinity of the upper end of the heater core 5 so as to be rotatably mounted on the casing 2. The air-mix damper 6 is a butterfly-shaped damper and is movably adjusted to any position between a maximum cooling position (Max Cool position) C, in which the tip of a plate damper portion 6B abuts against the sealing portion 11 to completely close the inlet of the heated air channel 13, and a maximum heating position (Max Hot position) H, in which the tip of the plate damper portion 6B abuts against the sealing portion 12 to completely close the inlet of the bypass channel 14. On the other hand, a plate damper portion 6C that is rotated together with the plate damper portion 6B and adjusts the level of opening of the heated air channel 13 at the outlet is configured to close the outlet of the heated air channel 13 when the air-mix damper 6 is in the maximum cooling position C.

Among the plurality of blowing-mode switching dampers 7, 8, and 9, the face damper 7 is rotatably provided at the face outlet 16, the DEF damper 8 is rotatably provided at the DEF outlet 17, and the foot damper 9 is rotatably provided at the inlet of the foot channel 18. These blowing-mode switching dampers 7, 8, and 9 are configured to be capable of opening or closing the corresponding outlets in conjunction with one another, and are switchable to a face mode in which the face damper 7 is opened, a defrost mode in which the DEF damper 8 is opened, a foot mode in which the foot damper 9 is opened, a DEF/foot mode in which both the DEF damper 8 and the foot damper 9 are opened, a bi-level mode in which both the face damper 7 and the foot damper 9 are opened, or the like. The rear seat duct 20 adjoins the face outlet 16, and the inlet thereof is connected thereto in a longitudinal direction (front-rear direction of the vehicle), and temperature-controlled cool air or warm air is guided toward the rear seats.

In the vehicle air conditioner 1 having the above-described structure, the heated air channel 13 is defined by a partition wall 2A that is integral with the casing 2, and the foot channel 18 is formed on the back side of the partition wall 2A (on the surface opposite to the heated air channel). An end 30 of this partition wall 2A, which constitutes the outlet of the heated air channel 13, is, as a whole, smoothly curved toward the air-mix area 15 and has a teardrop-shaped structure formed of a combination of curved surfaces having several different curvatures and planes having a linear cross section.

Figure 2:
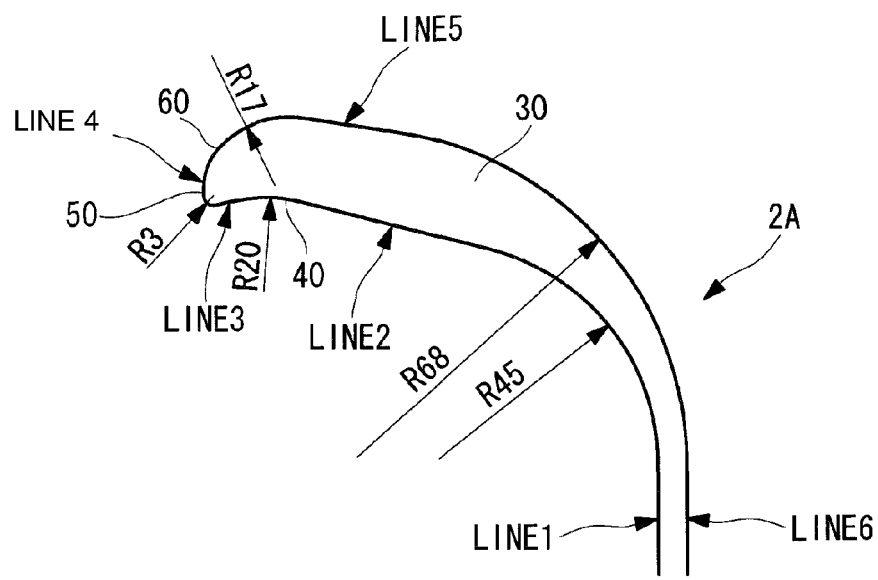
FIG. 2 is an enlarged side view showing the detailed structure of an end of a partition wall of the vehicle air conditioner according to the first embodiment of the present invention.
Figure 3:
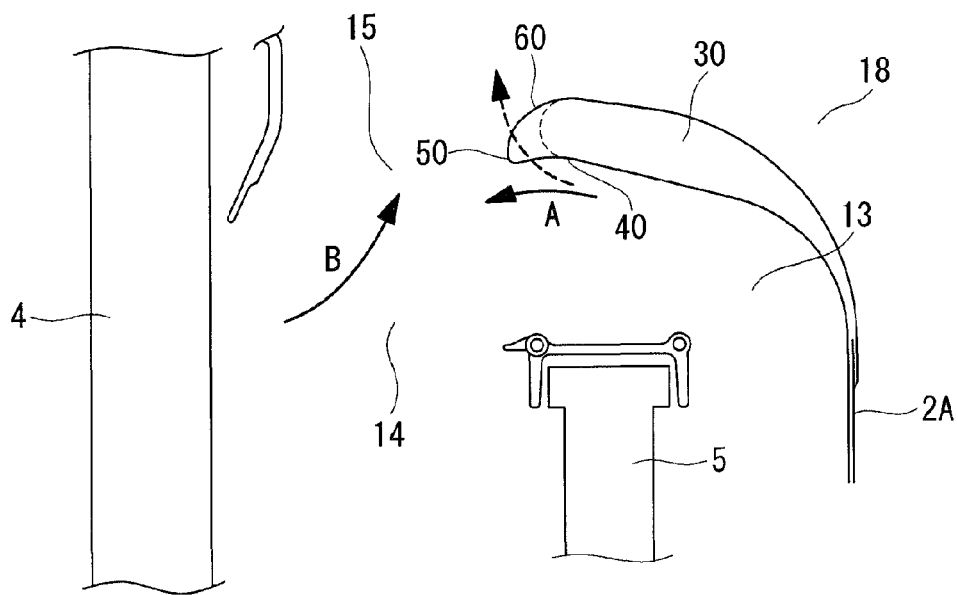
FIG. 3 is an explanatory drawing showing a flow state of airflow in an air-mix area of the vehicle air conditioner according to the first embodiment of the present invention.

FIG. 2 shows an example of the detailed structure of the end 30 of the partition wall. This end 30 has a wall surface, on the heated air channel 13 side, that is formed of a linear plane denoted by LINE 1, a concave curved surface with a radius denoted by R45, a linear plane denoted by LINE 2, a concave curved surface with a radius denoted by R20, a linear plane denoted by LINE 3, and a convex curved surface with a radius denoted by R3, and has a wall surface, on the foot channel 18 side, that is continuous therewith and is formed of a linear plane denoted by LINE 4, a convex curved surface with a radius denoted by R17, a linear plane denoted by LINE 5, a convex curved surface with a radius denoted by R68, and a linear plane denoted by LINE 6.

The aforementioned concave curved surface having a relatively small curvature with the radius R20 constitutes, at the outlet of the heated air channel 13, a direction changing portion 40 that directs the outflow direction of the airflow flowing from the heated air channel 13 to the air-mix area 15 toward the direction in which it collides with the cool air flowing from the bypass channel 14 to the air-mix area 15, and is a smooth concave curved surface. The convex curved surface having a relatively large curvature with the radius R3, which is continuous with the concave curved surface with the radius R20 constituting the direction changing portion 40 via the linear plane LINE 3, constitutes a mixing enhancement portion 50 that makes the airflow along the partition wall 2A easy to separate and makes it flow toward the air-mix area 15, and is a convex curved surface having a relatively large curvature. Furthermore, the convex curved surface having a relatively small curvature compare to R3 with the radius R17, which is continuous with the convex curved surface having the radius R3 constituting the mixing enhancement portion 50 via the linear plane LINE 4, constitutes an introduction portion 60 that smoothly introduces the airflow after air mixing into the foot channel 18, and is a convex curved surface having a smaller curvature than the convex curved surface having a large curvature that constitutes the mixing enhancement portion 50.

The above-described concave curved surface having the radius R20 constituting the direction changing portion 40 also constitutes a damper abutting surface to which, when the plate damper portion 6C of the air-mix damper 6 closes the outlet of the heated air channel 13 during maximum cooling (during Max Cool), the end thereof is abutted.

In the direction changing portion 40, the mixing enhancement portion 50, and the introduction portion 60, it is preferable that the radius of the concave curved surface constituting the direction changing portion 40 be set, for example, from about 15 mm to 25 mm, the radius of the convex curved surface constituting the mixing enhancement portion 50 be set, for example, from about 2 mm to 6 mm, and the radius of the convex curved surface constituting the introduction portion 60 be set, for example, from about 10 mm to 30 mm. However, these values fluctuate to some extent depending on the size of the unit or the like, and the teardrop shape may be modified to the optimum shape from a combination of curved surfaces and linear planes according to the unit and is not limited to the shape shown in the figure.

According to this embodiment described above, the following effects and advantages are achieved.

The airflow sent from the blower unit (not shown) to the air channel 3 of the HVAC unit 10 is cooled by heat exchange with refrigerant while passing through the evaporator 3, then is made to flow into the heated air channel 13 and the bypass channel 14 according to the flow rate ratio adjusted by the air-mix damper 6. The airflow which flowed into the heated air channel 13 is heated by heat exchange with warm water in the heater core 5, is adjusted to a selected temperature through air mixing with cool air from the bypass channel 14 in the air-mix area 15, and is then blown from the outlets 16, 17, 19, or the rear seat outlet (not shown) into the cabin, according to the blowing mode switched and selected by the plurality of blowing-mode switching dampers 7, 8, and 9.

During this time, the airflow (warm air) heated by the heater core 5 and flowing through the heated air channel 13 into the air-mix area 15 tends to flow along the partition wall 2A under the influence of the curved heated air channel 13 and the opened plate damper portion 6C. Then, as shown in FIG. 3, at the outlet of the heated air channel 13, as indicted by an arrow A, the entire warm air flow is directed to the direction in which it collides with cool air B flowing from the bypass channel 14 to the air-mix area 15 by the direction changing portion 40 formed of the concave curved surface provided at the end 30 of the partition wall.

The above-described warm air A is separated from the wall surface of the partition wall 2A by the mixing enhancement portion 50 formed of a convex curved surface having a large curvature, which is provided at the tip of the end 30 of the partition wall so as to be continuous with the direction changing portion 40, and flows toward the air-mix area 15. Because the mixing enhancement portion 50 is formed of a convex curved surface having a relatively large curvature, it can create an appropriate-sized separation that can enhance air mixing of the warm air A and the cool air B without causing excessive separation. This can improve the air mixing performance while restricting an increase in pressure loss due to the occurrence of a large separation. The temperature-controlled air that is air-mixed in this way is smoothly guided to the foot channel 18 along the convex curved surface of the introduction portion 60 having a relatively small curvature, which is continuous with the mixing enhancement portion 50, according to the blowing mode.

Thus, according to this embodiment, it is possible to maintain comfortable temperature-controlling properties by improving the air mixing performance, and at the same time, to increase the quietness by restricting pressure loss in the air-mix area as much as possible to increase the air flow rate and reduce noise.

Furthermore, although the end 30 of the partition wall is teardrop-shaped, because the shape is a combination of curved surfaces and linear planes, the design flexibility of the shape itself can be significantly improved. Thus, design of the optimal shape according to the unit configuration is possible.

Furthermore, because the direction changing portion 40 formed of a smooth concave curved surface is provided upstream of the mixing enhancement portion 50 so as to make all of the warm air A which passed through the heated air channel 13 flow in the direction in which it collides with the cool air B, into the air-mix area 15, mixing of the cool air B and the warm air A is enhanced and the air mixing performance is improved, whereby the difference between the upper and lower temperatures in the multi-blowing mode can be kept in an appropriate range and comfortable temperature control can be achieved. Moreover, because this makes it possible to narrow the air-mix area 15, the unit can be made compact. In addition, because the concave curved surface constituting the direction changing portion 40 also serves as the abutting surface to which the plate damper portion 6C of the air-mix damper 6 is abutted, the provision of a separate sealing portion for the damper is unnecessary. This can simplify the structure and, because the abutting surface is curved, improve the fit and increase the sealing properties.

Second Embodiment

Figure 4:
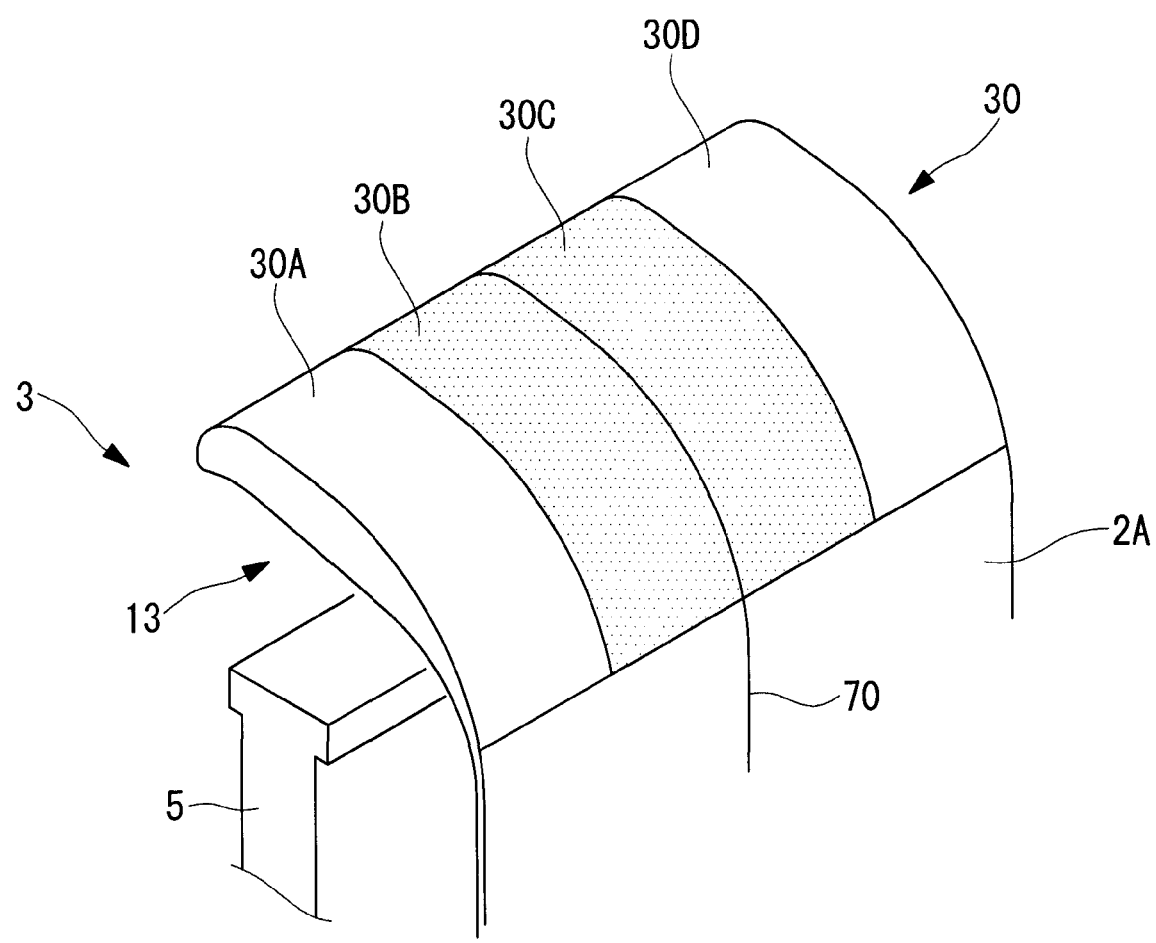
FIG. 4 is a perspective view showing the structure of a main part of a vehicle air conditioner according to a second embodiment of the present invention.

A second embodiment of the present invention will be described below using FIG. 4.

This embodiment differs from the above-described first embodiment in that the end 30 of the partition wall has a segmented structure. Because the other points are the same as those according to the first embodiment, an explanation thereof will be omitted. In this embodiment, the end 30 of the partition wall is separable into a plurality of segments 30A, 30B, 30C, and 30D, in the width direction of the air channel 3 (heated air channel 13).

It is possible that these segments 30A, 30B, 30C, and 30D are together formed as a single component separate from the partition wall 2A and are assembled to form the end 30. It is also possible that the segments 30A and 30D, together with the partition wall 2A, are formed integrally with left and right unit casings, the other segments 30B and 30C are formed as separate components, and they are assembled to form the end 30. Furthermore, it is possible that, in the case where a partition plate 70 for dividing the air channel 3 into left and right is provided at the central portion of the air channel 3 in the width direction, as in a vehicle air conditioner employing a left and right independent temperature control method, the segments 30A and 30D are formed integrally with the left and right unit casings, the segments 30B and 30C are formed integrally with the partition plate 70, and they are assembled to form the end 30.

As described above, even if it is difficult to form the end 30 of the partition wall integrally with the casing because of it having a teardrop shape and being thicker than the other portions of the partition wall 2A, it is possible to appropriately cope with a problem associated with shaping because a part or the entirety thereof can be formed separately. Furthermore, because the segment of the end 30 of the partition wall can be formed integrally with the partition plate 70 in a vehicle air conditioner employing the left and right independent temperature control method, even if the end of the partition wall has a segmented structure, the component count does not increase, allowing the segmented structure to be suitably employed.

The present invention is not limited to the above-described embodiments, and it may be appropriately modified so long as it does not depart from the gist thereof. For example, the plate damper portion 6C of the air-mix damper 6 may be omitted. Furthermore, regarding the teardrop shape of the end 30 of the partition wall, the channel wall surface on the foot side may be formed integrally with the separate foot duct. Moreover, the arrangement of the evaporator 4 and heater core 5 can be variously modified.

The invention claimed is:

1. A vehicle air conditioner in which a bypass channel and a heated air channel that has a heater core disposed therein, through which channels an airflow having a flow rate ratio adjusted by an air-mix damper flows, are formed in an air channel on the downstream side of an evaporator, a cooled airflow which passed through the bypass channel and a heated airflow which passed through the heated air channel being mixed in an air-mix area located downstream of the air-mix damper to be a mixed airflow, the mixed airflow being guided to a foot outlet through a foot channel provided on the back side of a partition wall constituting the heated air channel wherein a mixing enhancement portion that makes the heated airflow flowing along the partition wall flow toward the air-mix area and an introduction portion that is continuous with the mixing enhancement portion and smoothly guides the mixed airflow after air mixing to the foot channel are provided at an end of the partition wall constituting an outlet of the heated air channel, the mixing enhancement portion is formed of a first convex curved surface having a curvature allowing the heated airflow to be easily separated, the introduction portion is formed of a second convex curved surface having a smaller curvature than the first convex curved surface, the first convex curved surface and the second convex curved surface are connected by a first linear plane in a flow direction, and a direction changing portion that is formed of a smooth concave curved surface and directs an outflow direction of the heated airflow flowing from the heated air channel to the air-mix area toward a direction in which it collides with the cooled airflow flowing from the bypass channel to the air-mix area is provided in an upstream area of the mixing enhancement portion and on a wall surface on the heated air channel, wherein the partition wall has a wall surface, on the foot channel side, that is continuous with the first convex curved surface and that is formed of the first linear plane, the second convex surface, a second linear plane, a third convex curved surface, and a third linear plane, and wherein the first convex curved surface has a radius of several millimeters, and the second convex curved surface has a radius from about ten millimeters to several tens of millimeters.

2. The vehicle air conditioner according to claim 1, wherein the concave curved surface serves as a damper abutting surface to which an end of the air-mix damper is abutted when the outlet of the heated air channel is closed during maximum cooling.

3. The vehicle air conditioner according to claim 1, wherein the end of the partition wall is structured such that a part or the entirety thereof is formed to be segmented from other portions of the partition wall and the segment is assembled therewith.

4. The vehicle air conditioner according to claim 3, wherein the segment of the end of the partition wall is segmented into a plurality of segments in the width direction of the air channel and the segments are assembled.

5. The vehicle air conditioner according to claim 4, wherein the partition wall having a partition plate for dividing the air channel into left and right, and some of the segments are provided integrally with the partition plate.

* * * * *